United States Patent [19]
Axling et al.

[11] Patent Number: 5,638,435
[45] Date of Patent: Jun. 10, 1997

[54] IMPULSE SIGNAL CONVERTOR

[75] Inventors: Per Svante Axling, Älvsjö; Juan Hernandez, Stenhammar, both of Sweden

[73] Assignee: Telefonaktiebolaget LM Ericsson, Stockholm, Sweden

[21] Appl. No.: 440,390

[22] Filed: May 12, 1995

[51] Int. Cl.$^6$ ............................................. H04M 1/26
[52] U.S. Cl. ........................... 379/286; 379/353; 379/418
[58] Field of Search ................... 379/386, 281, 379/286, 105, 342, 287, 102, 103, 104, 353, 56, 57, 58, 59, 60, 418

[56] References Cited

U.S. PATENT DOCUMENTS

| | | | |
|---|---|---|---|
| 3,743,945 | 7/1973 | Sellari, Jr. | 379/386 |
| 3,879,583 | 4/1975 | Rooks | 379/286 |
| 3,927,264 | 12/1975 | Fish et al. | 379/105 |
| 3,935,392 | 1/1976 | Smith et al. | 379/386 |
| 4,055,730 | 10/1977 | Stapleford et al. | 379/372 |
| 4,618,742 | 10/1986 | Castro | 379/386 |
| 4,771,450 | 9/1988 | Castro et al. | 379/386 |
| 4,868,873 | 9/1989 | Kamil | 379/386 |
| 5,177,781 | 1/1993 | Ponton et al. | 379/339 |
| 5,218,636 | 6/1993 | Hamilton | 379/386 |

FOREIGN PATENT DOCUMENTS

94/10808  5/1988  WIPO.

OTHER PUBLICATIONS

Patent Abstracts of Japan vol. 14, No. 9 (E–870), Jan. 10, 1989 & JP, A, 01 255393 (Eiichi Yamazaki), Oct. 12, 1989.

P. Horowitz et al., *The Art of Electronics*, 2d ed., pp. 580–582, 669, Cambridge University Press (1989).

*Primary Examiner*—Krista M. Zele
*Assistant Examiner*—Scott Wolinsky
*Attorney, Agent, or Firm*—Burns, Doane, Swecker & Mathis, L.L.P.

[57] ABSTRACT

An impulse convertor for converting a received telephone impulse dialing signal into a restored dialing signal has a limiter-amplifier, a signal detector, an output formatter, and a controller. The limiter-amplifier receives the impulse dialing signal from an interface b to a communication system such as a public switched telephone network or a cellular network, limits the amplitude range of the received impulse dialing signal, and compensates for attenuation of the received impulse dialing signal. The signal detector analyzes successive portions of an output signal generated by the limiter-amplifier and determines dialed digits represented by the received impulse dialing signal. The output formatter converts the dialed digits determined by the signal detector into the restored dialing signal that is provided to a device C such as a PABX. The controller coordinates operation of the limiter-amplifier, signal detector, and output formatter.

10 Claims, 5 Drawing Sheets

TRAIN OF SPIKES

SWEDEN - DIAL "9"

MOSCOW - DIAL "9"

IMPULSE SIGNAL CONVERTOR

BACKGROUND

Applicants' invention relates to devices that enable conventional telephones to communicate through cellular radiotelephone networks.

Wire-line telephones control a standard land-based public switched telephone network ("PSTN") by sending dialing signals, which include dialed digits, through pairs of copper wires to a switch in a central office of the telephone company. The electrical characteristics of the copper wire pairs are well specified, and thus rotary as well as touch-tone wire-line telephones can be accommodated. In this application, "rotary telephone" will be understood to refer not only to a conventional telephone set having a dialing disk but also to any device that produces signals similar to those produced by such a telephone set.

When a wire-line telephone is used to call another wire-line telephone, the dialing and voice or data signals pass through a telephone channel that has a well-defined electrical bandwidth (typically, 300 hertz (Hz) to 3400 Hz) and some amount of attenuation. Sometimes a call passes through a radio connection provided by a cellular radiotelephone network. The caller may be completely unaware that a radio link is being used. In a cellular radiotelephone system, a base station (BS) communicates with a number of mobile stations (MSs) via one or more radio channels. Some current cellular mobile telephone systems use analog frequency modulation (FM) of a radio-frequency (RF) carrier signal to transmit speech and other information.

One principal standard is the Advanced Mobile Phone Service (AMPS) system in the U.S. that uses FM having a spacing of thirty kilohertz (30 KHz) between carrier signals having frequencies of about 880 megahertz (MHz). Some of the characteristics of the AMPS system are specified by the EIA/TIA-553 standard published by the Electronic Industries Association and Telecommunications Industry Association (EIA/TIA). Another principal standard is the Total Access Communications System (TACS) in the United Kingdom that uses spacings of 25 KHz between 880 MHz carrier signals. Yet another standard is the Nordic Mobile Telephone (NMT) system in Scandinavia that uses FM having spacings of 12.5 KHz between carriers in the 450 MHz and 900 MHz bands.

In general, a radio channel is a bi-directional radio transmission path between two transceivers, and thus the channel comprises two carriers having different frequencies, one for transmission and one for reception by a given transceiver. In the standard systems, the frequency spacing between the two carriers of any radio channel is 45 MHz.

One difference between a standard rotary wire-line telephone and a touch-tone wire-line telephone or a cellular telephone is that the rotary telephone still uses pulses to indicate dialed digits rather than tones that are suitable for transmission through the telephone channel. The pulses are generated by successively opening and closing a switch, thereby making and breaking a connection from a local battery of the telephone company. The time duration of each pulse is between about forty milliseconds (40 ms) and about 60 ms, depending on the applicable national standard.

These pulses do not have electrical characteristics that enable them to pass through a PSTN or cellular radio network without severe distortion. As a result, the digits dialed on a rotary telephone may be nearly unintelligible when they arrive at their destination.

SUMMARY

In accordance with one aspect of Applicants' invention, an impulse convertor for converting a received telephone impulse dialing signal into a restored dialing signal comprises a limiter-amplifier, a signal detector, an output formatter, and a controller. The limiter-amplifier receives the received impulse dialing signal, limits the amplitude range of the received impulse dialing signal, and compensates for attenuation of the received impulse dialing signal. The signal detector analyzes successive portions of an output signal generated by the limiter-amplifier and determines dialed digits represented by the received impulse dialing signal. The output formatter converts the dialed digits determined by the signal detector into the restored dialing signal. The controller coordinates operation of the limiter-amplifier, signal detector, and output formatter.

The received telephone impulse dialing signal may comprise a succession of spikes and the restored dialing signal may be an electrical signal that corresponds to pulses indicated by respective pairs of the spikes. The restored dialing signal may have characteristics that are predetermined and selectable, and be one of the group comprising a binary digital signal, a dual-tone multi-frequency (DTMF) analog signal, and an impulse dialing signal.

The output formatter may include one of the group comprising a DTMF generator and a digital signal generator. The impulse convertor may be transparent with respect to an established connection between a wire-line telephone and a central office. The impulse convertor may be configured to operate with one of a two-wire circuit and a four-wire circuit.

The signal detector may periodically sense output signals generated by the limiter-amplifier that correspond to three-level signal values, select a sequence of three-level signal values that is most likely to correspond accurately to the received impulse dialing signal, and determine the dialed digits based on the selected sequence.

BRIEF DESCRIPTION OF THE DRAWINGS

Applicants' invention is described below in more detail with reference to embodiments that are given only by way of example and that are illustrated in the accompanying drawings, in which.

DETAILED DESCRIPTION

This application describes an implementation in a PSTN as an example, but it will be understood that Applicants' invention can be used in other systems. For example, it is currently believed that Applicants' invention is useful in an NMT 450 public land mobile network (PLMN).

Figure 1:
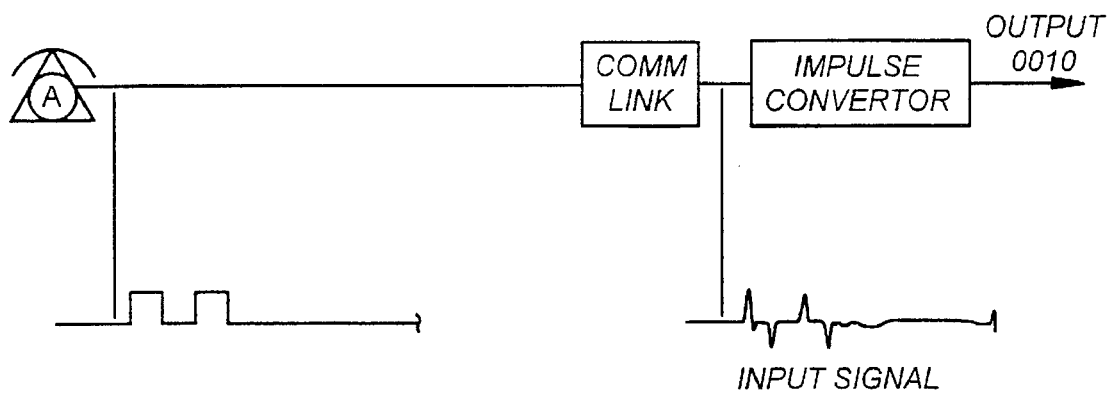
FIG. 1 illustrates an arrangement of Applicants' impulse convertor in a communication link to a wire-line telephone.

FIG. 1 illustrates an arrangement of Applicants' impulse convertor in a communication link to a wire-line rotary telephone. The communication link conventionally passes electrical signals having frequencies in the range of 300–3400 Hz between the wire-line telephone A and the impulse convertor. The impulse dialing signal generated by the wire-line telephone A is generally a train of square-edged pulses, each 40–60 ms long, and thus the impulse dialing signal includes frequencies that are much greater than 3400 Hz. As a result, the impulse dialing signal is severely distorted by the link, which acts substantially like a high-pass filter to the impulse dialing signal, in effect differentiating it.

Upon arriving at the impulse convertor, the impulse dialing signal is no longer a train of square-edged pulses but is a train of spikes having positive and negative portions that arise from temporal differentiation of the edges of the square pulses in the impulse dialing signal. Applicants have found that each edge of a dialing pulse gives rise to a series of spikes that is several milliseconds long, and the width of each spike in a series is about several hundred microseconds ($\mu$s), depending on the rotary disk standard used. Thus, each pulse arriving at the impulse convertor looks like a few-ms series of hundred-$\mu$s spikes having decreasing amplitudes followed by a 40–60 ms quiescent level followed by another series of spikes.

Figure 2A:
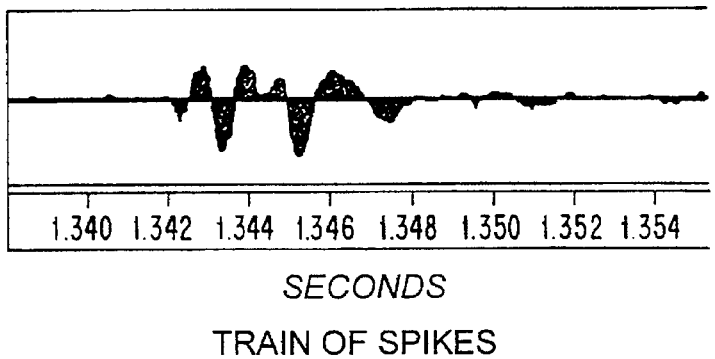
FIGS. 2A–2C illustrate impulse dialing signals.
Figure 2B:
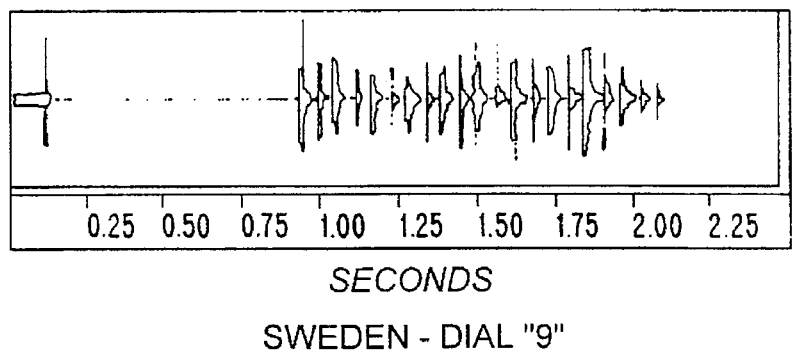
Figure 2C:
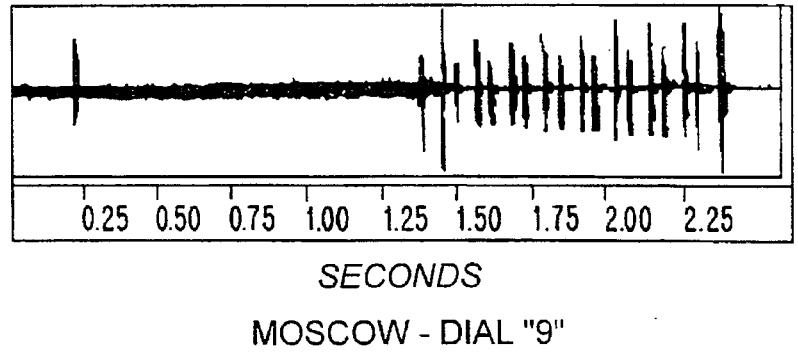

Such signals are illustrated in FIGS. 2A–2C. A portion of an input signal that might arrive at Applicants' impulse convertor is shown in FIG. 2A, comprising a series of eight significant spikes produced by one edge of a dialing pulse. The width of the series is approximately 6 ms, and the width of each spike is about 500 $\mu$s. FIGS. 2B, 2C show impulse dialing signals that might appear at the impulse convertor when the digit "9" is dialed according to the telephone standards in Sweden (FIG. 2B) and the Russian Federation (FIG. 2C). It will be noted that an initial series of spikes due to the start of rotation of the dial occurs in both cases about 0.75–1.25 seconds before the spikes indicating the dialed digit.

In accordance with Applicants' invention, the impulse convertor detects the spikes and generates an electrical signal that corresponds to the pulses indicated by appropriate pairs of series of detected spikes (viz., the telephone number dialed on the wire-line telephone A) and that has characteristics that are predetermined and selectable. Advantageously, the signal generated by the impulse convertor may be a four-bit digital signal, a DTMF analog signal, a restored impulse dialing signal, or any other desired form. With respect to an established voice or data connection between the wire-line telephone A and the central office, Applicants' impulse convertor is transparent, preferably because of the isolation provided by a high input impedance. Also, it will be appreciated that the impulse convertor can be configured to operate with either two-wire or four-wire circuits.

Figure 3:
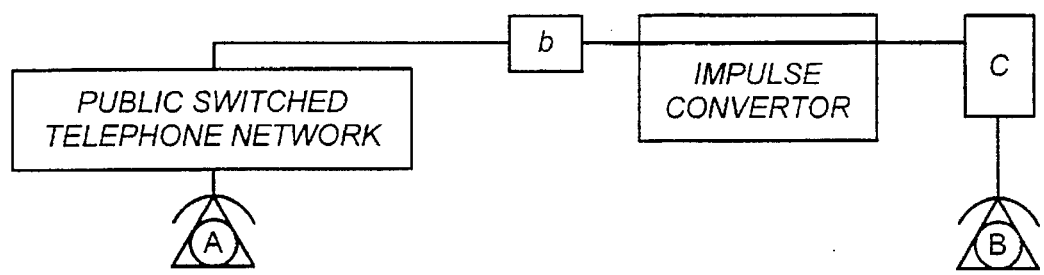
FIG. 3 illustrates an arrangement of Applicants' impulse convertor in conjunction with a private automatic branch exchange (PABX) that is connected to a PSTN.

Applicants' impulse convertor is particularly useful in conjunction with a PABX that is connected to a communication network like a PSTN. This arrangement using the trunks of the PABX is illustrated in FIG. 3. When a call is made, a voice or data path is established between the call-originating terminal A, which may be a wire-line rotary telephone, and the called terminal B, which may be any type of telephone, through the PSTN and the PABX. This is shown in FIG. 3, in which "C" represents the PABX, and "b" represents an interface between a PSTN and the impulse convertor. The call-originating terminal A dials the digits necessary to complete the call to the called terminal B, and these digits are transmitted through the telephone channel to Applicants' impulse convertor, which detects and formats the digits in such a way that the PABX C connects the called terminal B to the already established telephone channel between the call-originating terminal A and the PABX trunk.

Figure 4:
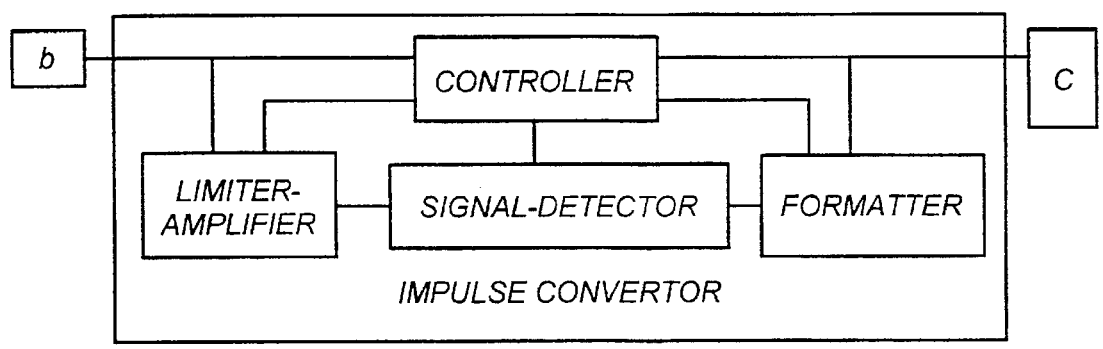
FIG. 4 is a block diagram of Applicants' impulse convertor.
Figure 6A:
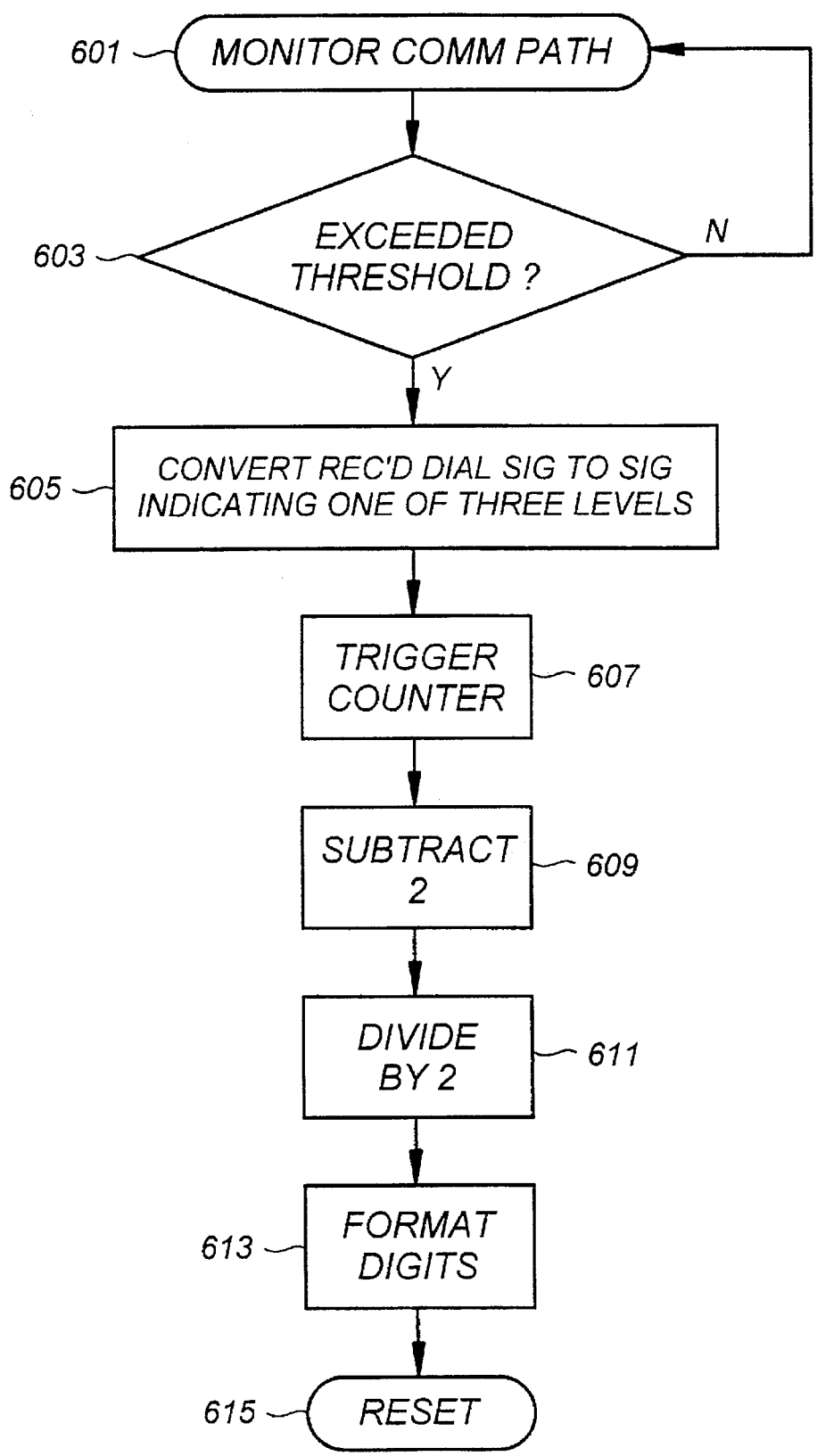
FIGS. 6A and 6B are flowcharts of steps carried out by Applicants' impulse convertor.
Figure 6B:
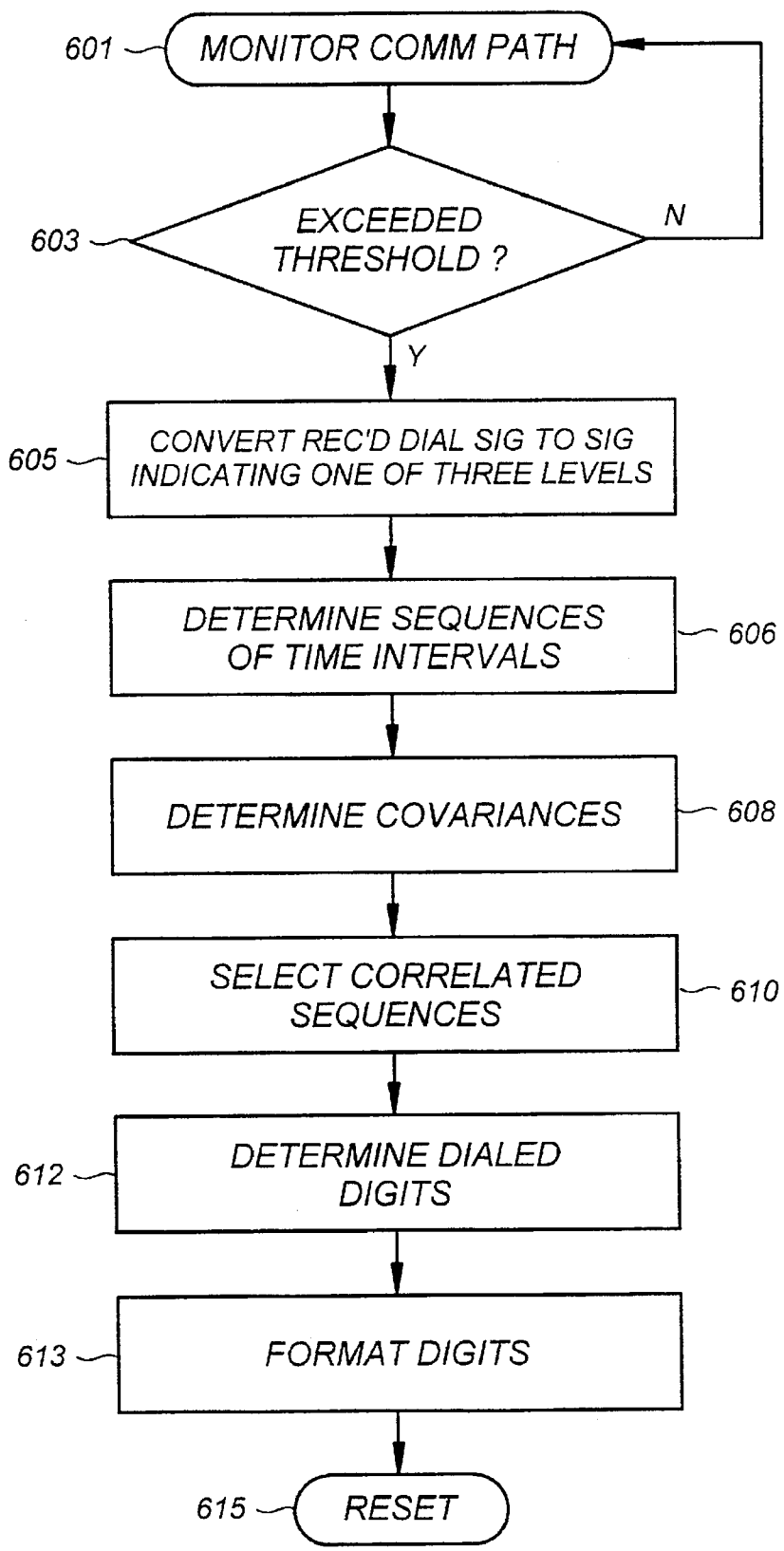

FIG. 4 is a block diagram of Applicants' impulse convertor, which comprises a limiter-amplifier, a signal detector, an output formatter, and a controller. The functions performed by these devices are described in more detail below. When a channel or path between the call-originating terminal A and the PABX trunk has been established, a signal indicating this condition is given to the controller in the impulse convertor, and in response the impulse convertor begins monitoring that path (see step 601 in FIGS. 6A and 6B).

The limiter-amplifier is the interface between signals on the 300–3400 Hz telephone channel and the signal detector. One function of the limiter-amplifier is to limit the range of the generally continuous, analog signal received from the channel. The limiter-amplifier does this by converting the received impulse dialing signal into an output signal indicating one of three levels: negative, zero, and positive. In one embodiment, a predetermined logic level, such as a logical ONE, at any one of three outputs of the limiter-amplifier indicates the appropriate level. When the limiter-amplifier detects that the input signal has exceeded a predetermined threshold (e.g., when one of its positive and negative outputs is at logical ONE; step 603 in FIGS. 6A and 6B), the limiter-amplifier enables the signal detector, which is preferably a microprocessor. Enabling the microprocessor in this way avoids unnecessary calculations as described below.

The limiter-amplifier can be implemented with a wide variety of electronic components, such as diodes, transistors, etc., that can be adjusted as necessary to compensate for the variable attenuation of the impulse dialing signal as it passes through a PSTN and/or cellular network. Since the frequencies of interest are low, a suitable bandwidth is easily obtained for the limiter-amplifier, as is a suitable voltage gain. For example, a voltage gain between five and fifteen is currently believed to be suitable. To convert the pulses (spikes) in the impulse dialing signal received by the impulse convertor into the three levels described above (see step 605 in FIGS. 6A and 6B), the limiter-amplifier can include either a hard-wired electronic circuit or a programmed microprocessor.

Figure 5:
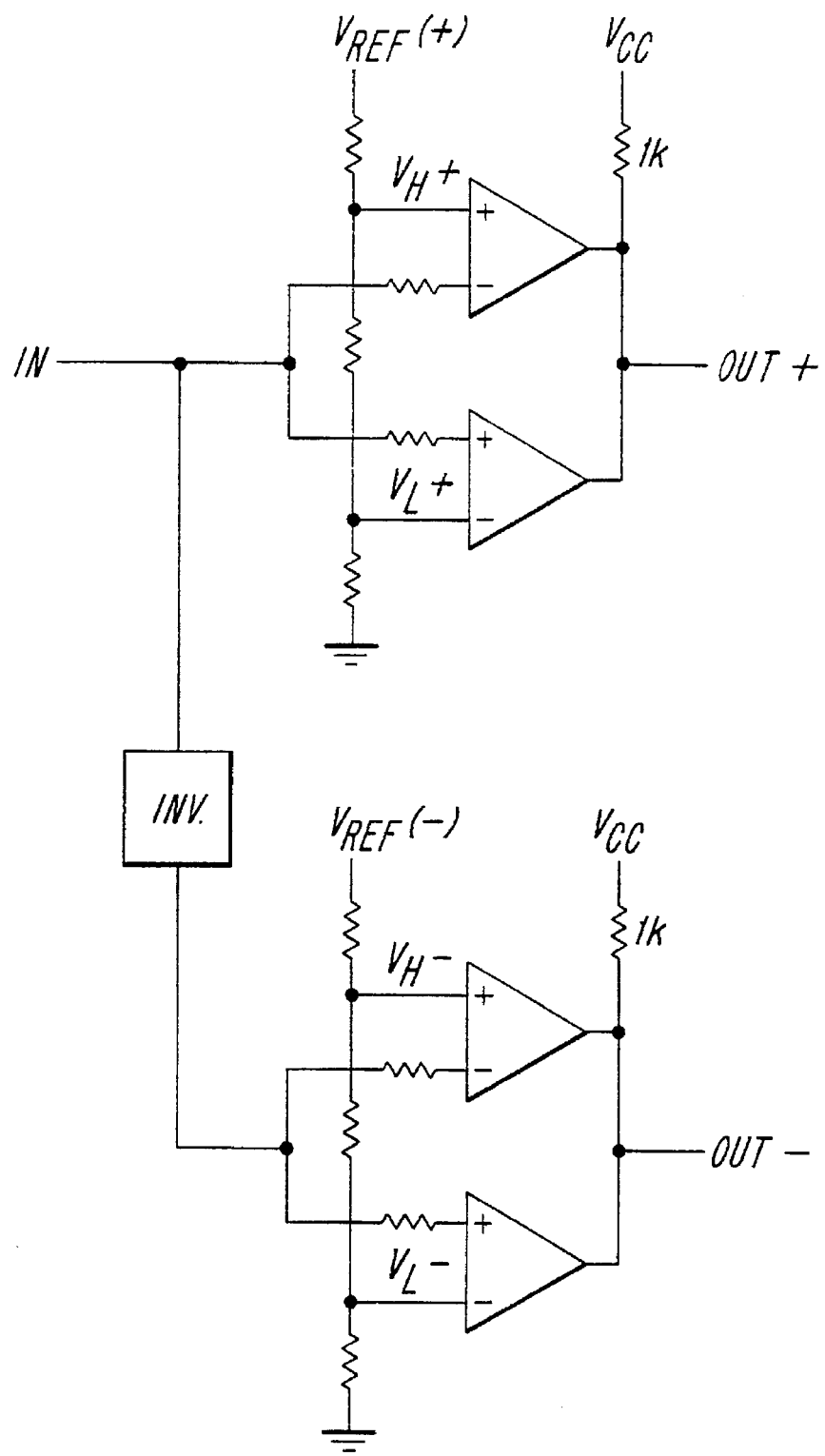
FIG. 5 is a schematic diagram of a dual window comparator.

As one example, the limiter-amplifier may be implemented as a dual window comparator, such as that described in P. Horowitz et al., *The Art of Electronics*, 2d ed., pp. 580–582, 669 Cambridge University Press (1989), and illustrated in FIG. 5. The output of one half of the dual window comparator (OUT+) is high (near $V_{CC}$) when the input voltage signal is between $V_L+$ and $V_H+$, and the output of the other half (OUT−) is high when the input voltage signal is between $V_L-$ and $V_H-$. A simple inverter can be used to reverse the polarity of the input voltage signal and enable the use of similar circuitry for the two halves of the window comparator. Choosing the thresholds $V_L-$, $V_H-$, $V_L+$, $V_H+$ appropriately and implicitly recognizing as the zero-input condition as that when both OUT− and OUT+ are low effectively converts the continuous analog impulse dialing signal received by Applicant's impulse convertor into the three levels described above.

The output signal produced by the limiter-amplifier is provided to the signal detector, which in one embodiment (steps 607, 609, and 611 in FIG. 6A) would include a binary counter that is triggered once by each series of spikes in the received impulse dialing signal (step 607). For such a signal detector, the negative spikes in each series in the dialing signal are converted to smoothed positive spikes by a suitably connected capacitor, yielding a signal having series of all positive-going spikes. This all-positive signal may be used for generating a trigger for the counter. It will be understood that an all-negative-going signal could also be used. A dialed digit is determined by subtracting two from the counter output (step 609) and dividing the result by two (step 611), which are functions that may be carried out by hard-wired electronic circuitry or a microprocessor. After the elapse of a time interval that is somewhat less than the characteristic interval between dialed digits, the counter is then reset in readiness for a subsequent dialed digit.

With a microprocessor as the signal detector, the limiter-amplifier produces a predetermined logic level, such as a logical ONE, at any one of three outputs to indicate the corresponding level of the input impulse dialing signal. The microprocessor senses these outputs periodically. For example, the important parts of the signal (e.g., those parts including the spikes of dialed digits) are preferably sensed more frequently (e.g., every 2 µs) than other parts (which may be sensed every 1 ms, for example). These values are important because more frequent sensing means more precision but also more calculations, generally requiring a faster, more expensive microprocessor. For some applications, the better performance might be worth the additional cost.

It is currently believed that a constant sampling rate of 44 KHz (sampling period of 23 µs) gives a suitable balance between precision and number of calculations without requiring the complication of a variable sampling rate. Such a sampling rate yields 264 samples of a 6 ms-long series of spikes, which is currently believed to be enough to cover all significant values of the series. One suitable microprocessor is the model MC68HC11 made by Motorola, Inc.

In essence, the method of determining a dialed digit that is carried out by the microprocessor (steps 606, 608, 610, and 612 in FIG. 6B) involves evaluating microprocessor input sequences $S_i$ that have the form: $S_i=X_1, Z_1, X_2, Z_2, X_3, Z_3, X_4, Z_4, X_5, Z_5, \ldots X_n, Z_n$ where $X_i=P$ or $N$ are time intervals during which the input signal is positive or negative, respectively, and $Z_i$ are time intervals during which the signal is zero. Each such sequence corresponds to a respective series of spikes due to an edge of a dialing pulse. An example of a typical input sequence is the following: 8, 6, −14, 6, 18, 4, −16, 28, −6, 10, 24, 10, −34, 28, 18, where the sequence elements (time intervals) were obtained by sampling an impulse dialing signal according to the Russian Federation standard at 44 KHz. It will be appreciated that a sequence element can explicitly represent a time interval, e.g., 8 µs, or implicitly represent a time interval as a number of sampling intervals (clock ticks).

In accordance with another aspect of Applicants' invention, the signal detector selects those sequences $S_i$ that have a high correlation between them. This process is called "microdetection". The selected sequences are displaced in time by an interval corresponding to the intervals between the rising and falling edges of the square-edged dialing pulses. The lengths of the intervals between the sequences, i.e., between the edges of the dialing pulses, are in certain predetermined ranges permitted by the various telephone standards used in the world. By comparing the lengths of these intervals to the permitted values (e.g., 40 ms, 50 ms, and 60 ms), sequences that do not fit the standards are removed and accuracy is improved. Such sequences that include atypical lengths are attributed to noise. Based on the most likely sequences, the signal detector decides which digit was actually dialed. The signal detector analyzes, in turn, each portion of the signal generated by the limiter-amplifier, thereby determining each digit dialed by the call-originating terminal A.

When one of the levels of the signal output of the limiter-amplifier has exceeded one of the thresholds, the output signals (the above-mentioned sequence) are applied to a microprocessor input port through a gate that may be controlled by a threshold crossing signal. The input port may be one that allows two strobe rates: a higher rate (e.g., every 2 µs) for determining the intervals $P_i$, $Z_i$, and $N_i$; and a lower rate simply for monitoring. For example, if the higher rate is one strobe every 2 µs and that rate is used for a period of, say, 4 ms, then the number of P, Z, N intervals that are input to the microprocessor is 2000. The usual number of actually dialed digits that could be determined from that many samples is about six to about twelve. Since it is necessary to store this information, the strobe rate and the period are important parameters. When not examining a portion of the impulse dialing signal in which an edge of a pulse is expected, the strobe rate is preferably set at the lower value, e.g., once every millisecond, simply for maintaining a time reference.

Each time the limiter-amplifier exceeds one of the thresholds, a new input sequence $S_i$ is detected (step 606). An enable idle condition of the signal detector is started upon reception of the first sequence, which is given by the following expression: $S_1=0, X_1, Z_1, \ldots$, where the first value 0 indicates the signal value at time $t_1=0$. The enable idle condition would normally be triggered by the initial pulse due to the start of rotation of the dial, which as noted above in connection with FIGS. 2B, 2C, occurs about one second before the pulses indicating the dialed digit. The second sequence then corresponds to the first-received edge of the first pulse of the dialed digit, and the second sequence is given by the following expression:

$$S_2=t_2, X_1, Z_1, \ldots$$

When the second sequence has ended, the microprocessor starts the microdetection of the input signals, referring to the rising and falling edges of the original impulses. Microdetection comprises determining the covariance function (step 608) that is given by the following expression:

$$R_{12}=\int f_1(t)f_2(t+\tau)dt$$

considering that the discrete-time signals $f_1$ and $f_2$ described by the sequences $S_1$ and $S_2$, respectively, are two samples of different stochastic processes having the same starting times. In reality, the signal $f_1$ starts at $t_1=0$ and the signal $f_2$ starts at some later time $t_2$, but it can be assumed that the time interval between the sequences is long enough that the few-ms sequence length is enough for evaluating the covariance. In the absence of noise, the intervals between the signals $f_1$, $f_2$ (sequences $S_1$, $S_2$) are not less than 30 ms; thus, it can be assumed that the signals $f_i$ take values +1, 0, or −1 in the interval from t=0 to, say, t=4 ms and 0 everywhere outside this interval. It will be noted that Applicants' impulse convertor needs to be able to handle signals according to all of the various national standards because incoming calls can arrive from anywhere.

The covariance $R_{12}$ is determined based on the sequences $S_1$, $S_2$, which means it is necessary to evaluate only the intervals during which both $S_1$ and $S_2$ are non-zero. Also, it can be assumed that the maximum of the covariance occurs near t=0, so it is currently believed that it is necessary to evaluate $R_{12}$ only at $\tau=0$. Higher precision is not needed because the mechanical adjustments of rotary wire-line telephones are worse than the interval taken. These assumptions help reduce the number of operations carried out by the microprocessor. If N is the number of samples, $f_s$ is the sampling frequency, and $R_0$ is a covariance threshold for deciding whether or not two sequences are correlated, increasing $f_s$ increases N and the range of $R_0$, yielding greater resolution. The cost of the improved resolution is more processor operations. It will be appreciated that the τ value can be modified when there are long intervals in which the signal has values between P and N that are different from zero.

When a third sequence is detected, covariances $R_{13}$ and $R_{23}$ are determined as above, and so forth. A suitable decision level $R_0$ for the covariance R is preferably established based on statistics derived from the covariances $R_{12}$, $R_{13}$, $R_{23}$, . . . . Normalization based on a root of the product of the autocorrelations of the sequences, e.g., $(R_{11}R_{22})^{1/2}$, can also be carried out, although this requires more calculations. Sequences yielding covariances that pass the decision level are selected (step 610), and the others are discarded. It will be recognized that the covariance of a sequence corresponding to a rising pulse edge and a sequence corresponding to a falling pulse edge will generally be negative because the respective series of spikes have inverse polarities.

The detection and microdetection processes continue until the following two events occur: a proper sequence is detected; and a predetermined time interval, such as eleven seconds, has elapsed since the first sequence was detected. After the predetermined time interval has elapsed, the signal detector is reset and the time counter is reset to zero. For practical reasons, permitted sequences of dialed digits are no longer than a certain number of digits, which can be dialed within the predetermined time interval. Briefly stated, the detection and microdetection processes determine the pulse edges in the impulse dialing signal by comparing candidate edges (valid sequences) to each other.

The times for the selected valid sequences are now considered in determining the dialed digits (step 612), with a precision that depends on the numbers of samples retained and the patterns considered. In other words, once the pulse edges are located, the time intervals between successive pairs of pulse edges are determined, with the expectation that these time intervals will correspond to one of the various national dialing standards. Different models in practical commercial applications may be realized giving better performance depending on the calculations involved, which will contribute to determining the characteristics of the microprocessor (e.g., its speed) and memory volume. The detected digits are then passed to the output formatter.

The output formatter converts the digits generated by the signal detector (either steps 607, 609, and 611 or steps 606, 608, 610, and 612) into a signal having a format that is appropriate for the PABX or other device following the impulse convertor (step 613). As described above, the dialed digits can be presented by the output formatter as DTMF signals, binary signals, impulse dialing signals, etc. If desired, the output formatter can be implemented either as a hard-wired analog or digital circuit or as programming in the controller. Thus, the output formatter includes a conventional DTMF generator for converting the pulse signals received into DTMF analog dialing signals and a digital signal generator for converting those pulse signals into a set of parallel binary signals.

The controller coordinates the operations of the other components of the impulse convertor. From an external point of view, the impulse convertor preferably remains idle until the last digit is received by the output formatter. The controller informs the PABX through the interface that a sequence of digits has been received according to the selected format, and then the impulse convertor is reset in readiness for the next dialing signal (step 615). It is necessary only for the controller remains active, awaiting a signal for enabling the impulse convertor during a voice or data communication for special applications or for passing control to the interface with the PSTN for awaiting a new call.

When the digits produced by the output formatter are recognized by the PABX or other device following the impulse convertor, the controller causes a voice path through the impulse convertor to close and remain closed until the call is completed. As described above, the input impedance of the limiter-amplifier is high, so the limiter-amplifier can remain connected to the line even during a call.

As noted above, Applicants' impulse convertor needs to be able to handle signals according to all of the various national standards because incoming calls can arrive from anywhere. It could be advantageous to add some restrictions for allowing international access, such as limiting the use of extension numbers to odd or even ones, adding a digit with a parity in the extension number, and/or using one predetermined digit in the extension numbers (e.g., all extensions need to have a "1").

It will be understood that Applicants' invention is not limited to the particular embodiments that have been described and illustrated. This application contemplates any and all modifications that fall within the spirit and scope of Applicants' invention as defined by the following claims.

What is claimed is:

1. An impulse convertor for converting a received telephone impulse dialing signal into a restored dialing signal, comprising:

a limiter-amplifier for converting the received impulse dialing signal into an output signal indicating one of three levels;

a signal detector for analyzing, in turn, successive portions of the output signal generated by the limiter-amplifier and for determining dialed digits represented by the received impulse dialing signal;

an output formatter for converting the dialed digits determined by the signal detector into the restored dialing signal; and a controller for coordinating operation of the limiter-amplifier, signal detector, and output formatter.

2. The impulse convertor of claim 1, wherein the received telephone impulse dialing signal comprises a succession of series of spikes and the restored dialing signal is an electrical signal that corresponds to pulses indicated by respective successive pairs of the series of spikes.

3. The impulse convertor of claim 1, wherein the restored dialing signal has characteristics that are predetermined and selectable.

4. The impulse convertor of claim 3, wherein the restored dialing signal is one of the group comprising a binary digital signal, a DTMF analog signal, and an impulse dialing signal.

5. The impulse convertor of claim 3, wherein the output formatter includes one of the group comprising a DTMF generator and a digital signal generator.

6. The impulse convertor of claim 1, wherein the impulse convertor is transparent with respect to an established connection between a wire-line telephone and a central office.

7. The impulse convertor of claim 1, wherein the impulse convertor is configured to operate with one of a two-wire circuit and a four-wire circuit.

8. The impulse convertor of claim 1, wherein the signal detector periodically senses the limiter-amplifier output signal indicating one of three levels, selects sequences of sensed signal values that are most likely to correspond to edges of pulses in the impulse dialing signal, and determines the dialed digits based on the selected sequences.

9. A method of converting a received telephone impulse dialing signal into a restored dialing signal, comprising the steps of:

converting the received impulse dialing signal into a signal indicating one of three levels;

analyzing the converted signal and determining dialed digits represented by the received impulse dialing signal; and converting the determined dialed digits into the restored dialing signal.

10. The method of claim 9, wherein the analyzing and determining steps comprise the steps of determining sequences of time intervals from the converted signal, determining covariances of pairs of the sequences of time intervals, selecting correlated sequences of time intervals based on the covariances, and determining the dialed digits based on the selected sequences.

* * * * *